R. P. KERR.
INTERNAL COMBUSTION ENGINE.
APPLICATION FILED OCT. 14, 1918.
1,316,245.
Patented Sept. 16, 1919.
5 SHEETS—SHEET 1.
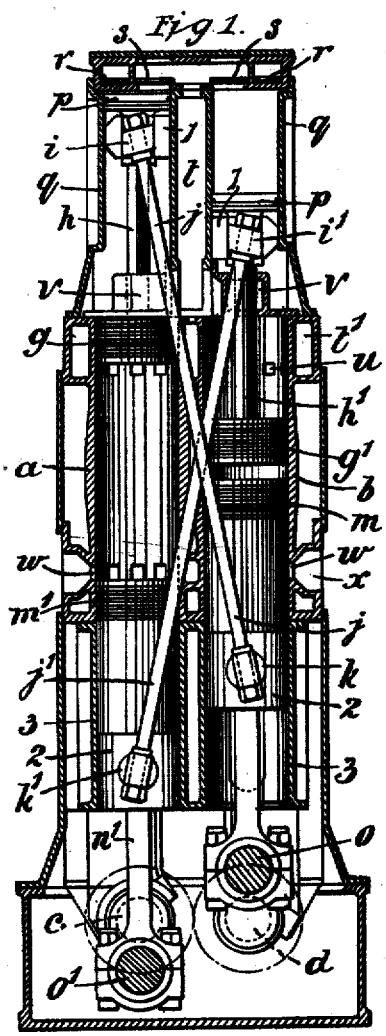
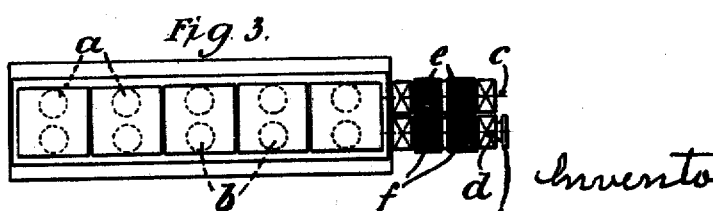

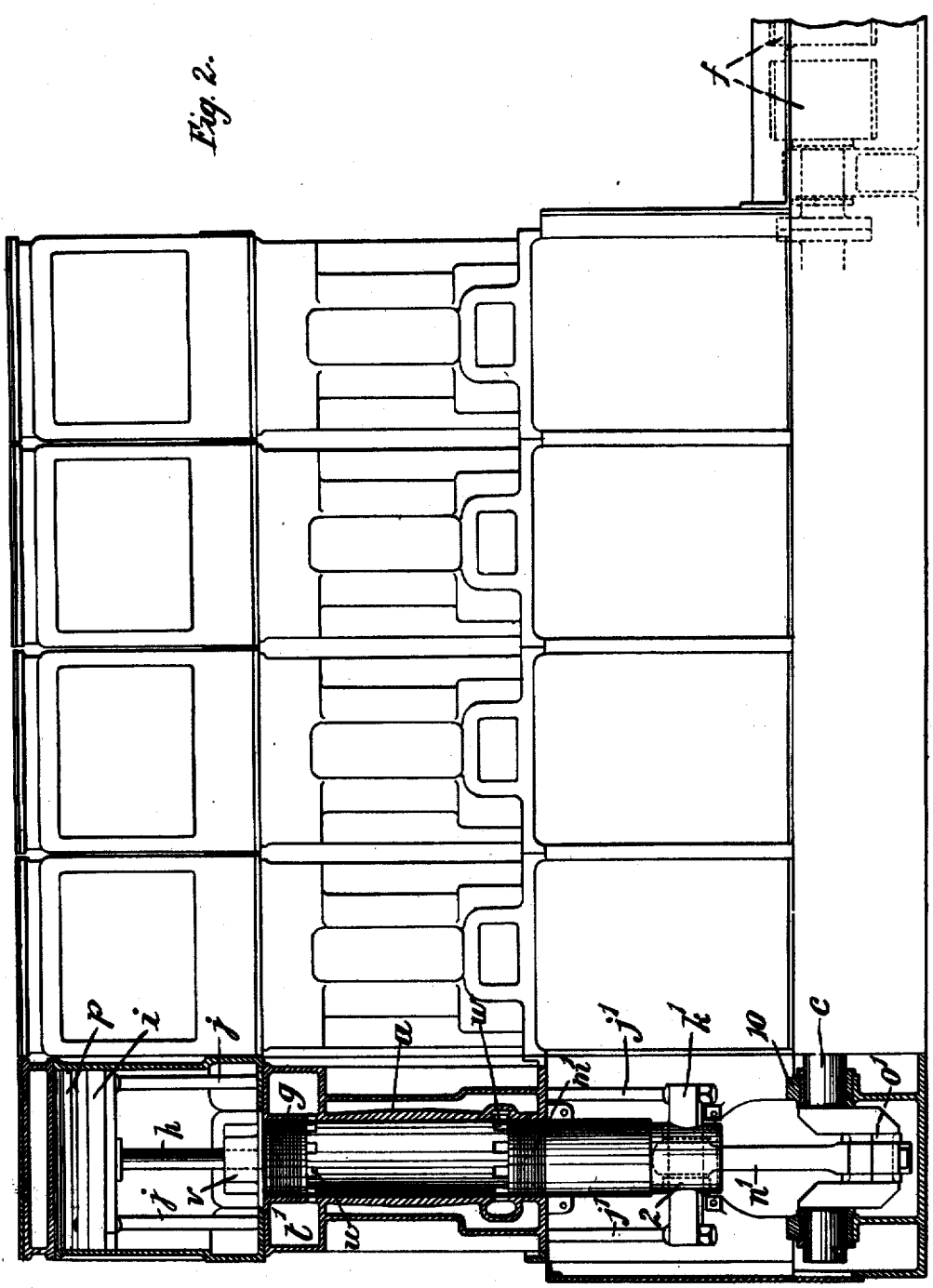

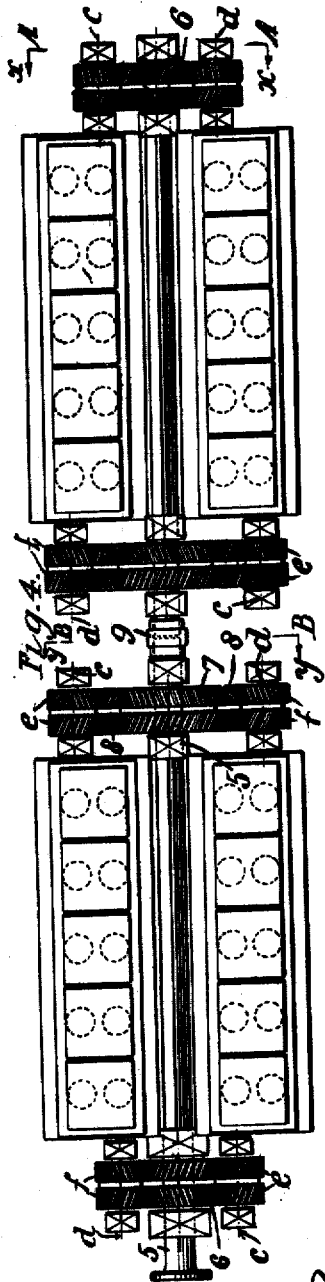

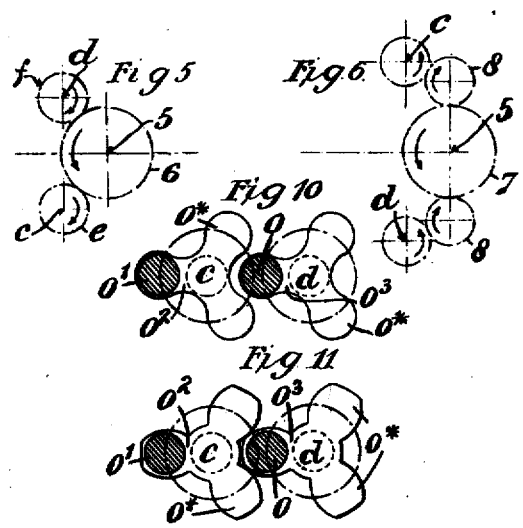
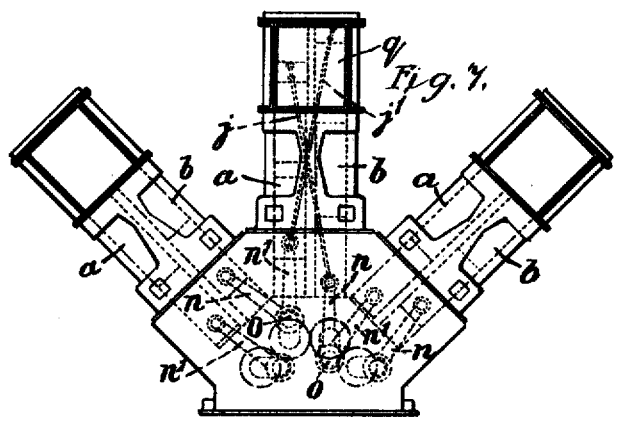

R. P. KERR.
INTERNAL COMBUSTION ENGINE.
APPLICATION FILED OCT. 14, 1918.
1,316,245.
Patented Sept. 16, 1919.
5 SHEETS—SHEET 5.
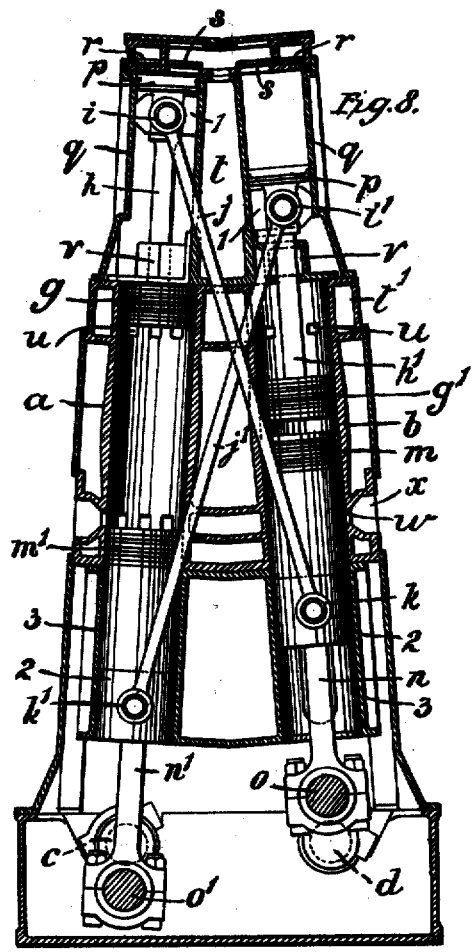
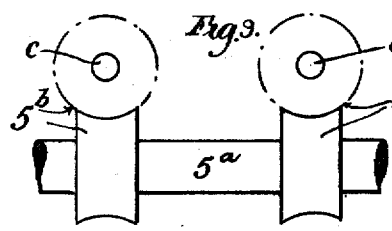

UNITED STATES PATENT OFFICE.

ROBERT PRICE KERR, OF GATESHEAD, ENGLAND, ASSIGNOR TO HIMSELF, THE BALANCED ENGINE SYNDICATE LIMITED, OF NEWCASTLE-UPON-TYNE, ENGLAND, AND WILLIAM ARNOLD RILEY, OF GOSFORTH, ENGLAND.

INTERNAL-COMBUSTION ENGINE.

1,316,245.     Specification of Letters Patent.     Patented Sept. 16, 1919.

Application filed October 14, 1918. Serial No. 258,046.

*To all whom it may concern:*

Be it known that I, ROBERT PRICE KERR, a subject of the King of Great Britain and Ireland, residing at Gateshead-upon-Tyne, in the county of Durham, England, have invented Improvements in or Relating to Internal-Combustion Engines, of which the following is a specification.

This invention relates to internal combustion engines of the type described in the specification of Patent No. 995,857, granted to H. F. Fullagar, according to which an internal combustion engine, or each unit of such an engine, comprises two cylinders arranged side by side and each provided with two pistons, the upper piston in each cylinder being cross connected to the lower piston in the other cylinder by external oblique rods and each pair of cross connected pistons working through its set of oblique rods and a connecting rod on to a single corresponding crank.

In the specific construction of engine described in the said former specification the two pairs of cross connected pistons of the engine, or of each unit thereof, work on two cranks arranged 180° apart on the same crank shaft.

Now the present invention has reference to an internal combustion engine of the kind referred to which, while possessing the inherent advantages of the known type of engine, possesses several additional practical advantages, especially as regards weight, dimensions of parts, maximum torque at the bearings, direction of thrust of the oblique rods and cross heads, and spaces occupied by the engine, as compared with an engine of the kind referred to, of equal power, as heretofore constructed.

In an engine of the kind referred to constructed according to the present invention, the two cylinders of the unit, or of each unit, are arranged with their axes in a plane at right angles to two parallel crank shafts arranged at the same end of the unit, and on to which their cross connected pistons respectively work so that the power exerted by the two sets of pistons is divided between two shafts that are geared together to insure that the cranks thereon shall be maintained in their proper relative angular positions. In the case of an engine designed to run in either direction, that is to say a reversible engine, the cranks will be arranged 180° apart, but in the case of an engine designed to be run in one direction only, the cranks may be arranged at any desired relative angular position. Any desired number of engine units can be arranged as described working on to separate pairs of cranks on the two shafts, the cranks in each pair thereof being arranged at any desired angular relation with reference to those in the other pair or pairs with the object of obtaining as uniform a turning effort on the shafts as possible.

Usually the cylinders will be arranged to extend upwardly over the two crank shafts but they could if desired be arranged horizontally, or inclined to the horizontal, to suit special requirements. In any of these cases, the cylinders of each pair may be arranged with their axes parallel to one another, or inclined to one another. In the latter case the axes may be farther apart at the ends nearest the crank shafts than at the other ends, though the reverse arrangement may sometimes be adopted.

Power can be taken off from either shaft, or from each of them, as may be desired.

In the first case, one of the shafts may be extended beyond the other at one end of the engine and the gearing between them, which may conveniently be helical gearing, would only have to transmit half the power produced. In the second case, the gearing would only have to take up any variation between the engine power and the machine load, for which purpose, power would be transmitted through the gearing from the shaft driving one machine to the shaft driving the other machine.

Internal combustion engine units according to the invention can be variously combined together and with a driving shaft to suit varying requirements.

In the accompanying drawings, Figure 1 shows in transverse section and Fig. 2 partly in side elevation and partly in vertical section, so much of a reversible multiple unit engine of the kind described, as is necessary to a clear understanding of the invention. Fig. 3 is a plan view of the engine to a smaller scale than Figs. 1 and 2. Fig. 4 shows in plan a number of such engines geared to an intermediate power shaft common to them. Figs. 5 and 6 are diagrammatic views corresponding to the line A A and B B respectively of Fig. 4 looking in the direction of the arrows $x$ and $y$ respectively and showing the gearing between the engine shafts and the intermediate power shaft. Fig. 7 is an end view showing another arrangement wherein several multiple unit engines are inclined to one another. Fig. 8 is a similar view to Fig. 1 showing a modified arrangement. Fig. 9 shows diagrammatically a modified arrangement of gearing between the engine crank shafts and a power shaft driven therefrom. Figs. 10 and 11 show in end view and diagrammatically, how the crank shafts of an engine according to the invention can be maintained in proper angular relationship to each other in the event of the toothed gearing between the engine crank shafts, or between the crank shafts and a power shaft driven therefrom, failing.

The reversible multi-unit engine shown in Figs. 1, 2 and 3 is designed to operate on the two stroke cycle and comprises five pairs cylinders $a$ and $b$ and two five-throw crank shafts $c$ and $d$ which are coupled together at one end by a pair of double helical gear wheels $e$ and $f$.

The upper piston $g$ of cylinder $a$ is connected by a piston rod $h$ to an upper crosshead $i$ which is coupled by means of a pair of diagonal side rods $j$ to a lower crosshead $k$ carrying the lower piston $m$ of the adjacent cylinder $b$. The reciprocating motion of this moving line is converted into a circular motion at the crank shaft $d$ through the connecting rod $n$ and a crank pin $o$.

The upper piston $g^1$ of cylinder $b$ is similarly connected by a piston rod $h^1$ to a crosshead $i^1$ which is coupled by a pair of diagonal side rods $j^1$ to the lower cross head $k^1$ carrying the lower piston $m^1$ of cylinder $a$, this line working on to the other crank shaft $c$ through the connecting rod $n^1$ and crank pin $o^1$.

Each upper cross head $i$ and $i^1$ has attached to it a piston $p$ of rectangular shape which, moving in a rectangular stationary tubular part $q$ of the structure forms therewith an air pump, the two pumps supplying the necessary air for the pair of cylinders $a$ and $b$ for scavenging. The air is drawn in from the atmosphere by each piston $p$ through inlet valve $r$ and discharged through outlet valves $s$ the air passing by a passage $t$ in the stationary part of the structure into the air chamber $t^1$ surrounding the inlet ports $u$ which are situated at the upper end of the cylinders $a$ and $b$ and are uncovered by the upper pistons $g, g^1$ at the required times. The upper sides of the upper pistons $g$ and $g^1$ are open to the passage $t$ and the air chamber $t^1$ and packing boxes are provided at $v$ to prevent leakages of air past the piston rods $h$ and $h^1$.

In the claims hereunto appended the term "cylinder" is intended to include any form of hollow inclosing members having cylindrical end portions for the reception of a pair of oppositely movable pistons, whether such end portions have their axes in alinement or are displaced so as to be parallel or inclined to one another as described in the specifications of the respective Letters Patent herein recited.

The exhaust ports $w$ are situated at the lower ends of the cylinders $a$ and $b$ and are controlled by the lower pistons $m$, $m^1$ the exhaust gases being led away by any convenient pipe arrangement from the exhaust passages $x$.

The upper cross heads $i$ and $i^1$ are each provided with a slipper 1 to take the horizontal thrust due to the diagonally inclined rods $j$, $j^1$ each slipper working against the surface of the rectangular stationary part $q$ of the structure forming the corresponding scavenge air pump cylinder.

The lower cross heads $k$, $k^1$ are each provided with a turned slipper 2 working in a bored guide 3 that may as shown, be of the same diameter as that of the lower piston $m$ or $m^1$, or it may be, of a greater diameter than such piston. The slipper takes the resultant horizontal pressure due to the corresponding pair of diagonally inclined rods $j$ or $j^1$ and the corresponding connecting rod $n$ or $n^1$.

The engine can be worked with liquid or gaseous fuel.

When liquid fuel, is to be used as the motive fluid, the combustion chambers (formed by each cylinder $a$ or $b$ and between the pair of pistons $g$ $m^1$ or $g^1$ $m$ therein) in this type of engine would each be fitted with two valves situated directly opposite to each other. One of these valves serving as an admission valve for the fuel would be arranged at one side of the chamber and the other serving as an air starting or compression release valve would be arranged at the other side of the chamber.

Where compressed air is used for maneuvering purposes it would be convenient to arrange a valve for admitting the compressed air on the expansion stroke of each of the cylinders say $a$ above one crank shaft say $c$, the cylinders $b$ above the other crank shaft $d$ being fitted with compression release valves only, each coupled to a common air transfer main.

When compressed air is used for starting up only an air starting valve need be fitted to the two cylinders $a$ and $b$ of one unit only. In this case, and in cases where the starting is done by means external to the working cylinders $a$ and $b$, such as by admitting starting air to the scavenge air pump cylinders $q$ or by motoring the engine by an external gear, each cylinder $a$ and $b$ would be fitted with a compression release valve and the valves of the two cylinders of such unit be coupled together so that the air displaced from between the pistons say $g$ and $m^1$ of one cylinder, say $a$ of the unit when they are approaching each other will pass to the space between the pistons say $g^1$ and $m$ of the adjacent cylinder say $b$, in which the pistons are receding from one another.

Fig. 3 illustrates the direct method of connecting the two crank shafts $c$ and $d$. A double helical gear wheel $e$ or $f$ is connected to each crank shaft, the two wheels gearing together. The power from one of the crank shafts say $c$ is transmitted to the other say $d$ through the two wheels and the power from both taken off at the coupling 4.

If desired, power may be taken from each crank shaft separately and the gearing would then only have to take up any variation between the engine power and the machine load, in which case power would be transmitted through the gearing from the shaft driving one machine to the shaft driving the other machine.

Figs. 4, 5 and 6 show an arrangement of multiple unit engines in which the two crank shafts $c$ and $d$ of each engine are coupled together indirectly, an intermediate shaft 5 from which the power may conveniently be taken and which may run at any desired speed relative to the engine speed, being used. This arrangement is a convenient one for use in a ship where the propeller would be driven by means of a tail shaft coupled direct to the intermediate shaft 5. The arrangement comprises four sets of multiple unit engines similar to that shown in Figs. 1, 2 and 3, but in which the two crank shafts of each engine are not directly coupled. Each crank shaft $c$ and $d$ of each engine is provided with a gear wheel $e$ or $f$ the two gear wheels being at opposite ends of the engine. The gear wheel $f$ on the crank shaft $d$ nearer to the intermediate shaft 5 at one end of the engine is coupled direct to this shaft by a gear wheel 6 while the gear wheel $e$ at the other end of the engine and on the crank shaft $c$ more remote from the intermediate shaft, is geared to this shaft by means of a gear wheel 7 and an idle wheel 8.

Two multiple unit engines placed at opposite sides of the intermediate shaft 5 can conveniently be geared to the same wheels 6 and 7 and a number of such pairs of engines arranged along the intermediate shaft 5. Fig. 4 shows two pairs of engines arranged as described.

Where it is desirable to run for long periods at reduced loads, the intermediate shaft 5 may, as shown, be made in sections coupled together by means of a clutch as at 9 so that when running at reduced loads and the clutch is opened, and the left hand pair of engines are working, these engines will not have to drive the right hand pair of engines.

Fig. 7 shows an arrangement of engine in which the cylinder units are arranged inclined to one another over and partly around the crank shafts. In this case the connecting rods of adjacent cylinders of adjacent pairs of cylinders are connected to the same crank pin $o$. In such an arrangement of the cylinder units the number of shafts required will be one more than the number of cylinder units in one transverse plane except when the units are placed completely around a circular transverse plane in which case the number of crank shafts will be the same as the number of units in the plane. In the latter case, each crank of each crank shaft has two connecting rods jointed to it, while in the first case, such as shown in Fig. 7, this will be so with all the cranks except the two outermost cranks each of which will only have one connecting rod connected to it. The crank shafts are all geared together, and the power may be taken off any one, or more than one, of such shafts.

In the example hereinbefore described, the cylinders $a$ and $b$ of each unit are arranged with their axes parallel. They may however, as hereinbefore mentioned, be arranged with their axes inclined to one another, as shown for example in Fig. 8, where the ends of the cylinders nearest the crank shafts are farther apart than the opposite ends. In such engines, the diagonal rods $j$, $j^1$ will not be rigidly fixed to the cross heads $i$ $i^1$, and $k$, $k^1$ but will be journaled on turned pins on such cross heads and be free to move thereon in planes parallel to the plane in which the axes of the two cylinders of the unit are arranged.

The crank shafts of an engine according to the invention instead of driving another shaft parallel to them may, if desired, drive a shaft arranged at right angles or other angles to them, through worm or helical gearing or through skew bevel gearing, as shown for example in Fig. 9 where the two engine crank shafts $c$ and $d$ drive a shaft $5^a$ arranged at right angles and common to them through worm or helical gearing $5^b$.

The pair of crank webs $o^2$ and $o^3$ carrying the crank pins $o^1$ and $o$ of the crank shaft $c$ and $d$ may, as shown in Fig. 10, or in Fig. 11, be made in the form of three teeth, or it may be, other suitable number of teeth, the teeth of each pair, or of the two pairs, of crank webs of the unit, or of each unit, or it may be of one unit, in a multiple unit engine, being adapted to gear together as shown. By this means in the event of the gear wheels used for directly, or indirectly through a third shaft, maintaining the angular relationship of the two crank shafts, failing for any reason to act for the purpose mentioned, the geared crank webs will come into action to maintain the angular relationship of the crank shafts and prevent the connecting rods and crank pins fouling each other and enable the engine to be brought to rest without damage thereof. This construction of the crank webs will also serve to partly balance the stresses on the crank shafts.

As will be seen, in a multiple unit engine according to the invention, as the pairs of cylinders $a$, $b$ of each unit are arranged transversely to the crank shafts, the length of the engine is considerably reduced as compared with the earlier construction hereinbefore referred to but the width is increased by an amount depending upon the distance apart of the two cylinders in each unit. The actual space occupied by the engine will however be appreciably less than with the former arrangement of the cylinders in an engine of equal power.

As in a multiple unit engine constructed as hereinbefore described, each unit works on to cranks on separate shafts, each shaft can be supported by a main bearing 10 between adjacent cranks on the same shaft, so that the centers of the bearings for each crank shaft and the length of the portion of the shaft between adjacent bearings can be lessened and the diameter of the crank shaft reduced in consequence.

In addition to the torque transmitted from any preceding crank, the variations in torque at each main bearing is that due to the loading of one piston only of each cylinder the variation due to the other piston being taken by the other crank shaft.

Also, as there are at least two crank shafts, each will only require to be strong enough at the power end to take one half, or in the case of an engine such as shown in Fig. 7, less than one half of the total power of the engine. Consequently, the diameter of each shaft adopted for this purpose will determine and govern advantageously, the dimensions of the main bearings, crank pins and other parts throughout the engine.

Furthermore, as the connecting rod and oblique rod thrusts are in the same direction one slipper and guide only are required for the lower cross head connected to each pair of oblique rods, and provision has to be made for adjustment of such slipper and guide in one direction only. The bearing area of the slipper and guide will also be less than has heretofore been necessary. The use of a single slipper on a guide surface, which may be of the bored type and a continuation of the cylinder bore as shown, very appreciably lessens the machining and fitting required compared with the work necessary on two slippers and guides arranged at right angles to one another as heretofore necessary.

Engines of the type described in the specification of Patent No. 995858, also granted to H. F. Fullagar, according to which an internal combustion engine, or each unit of such an engine, comprises two cylinders each provided with two pistons and so twisted as to form in effect two pairs of cross connected cylinders the upper piston in each cylinder being connected to the lower piston in the other cylinder by a pair of vertical rods working through a connecting rod on to a single corresponding crank, may also be arranged, according to the present invention, to work on to two parallel and geared shafts in the manner hereinbefore described with reference to an engine of the type described in the first mentioned prior specification. Such a construction of engine will readily be understood without drawings.

From the foregoing, it will be seen that an engine constructed according to the present invention can be made lighter and smaller and therefore at less cost than engines of the kind referred to of equal power as heretofore constructed.

What I claim is:—

1. An internal combustion engine of the kind referred to, comprising two revoluble shafts arranged side by side, cranks thereon, a pair of cylinders also arranged side by side, two oppositely movable pistons in each cylinder, coupling rods connecting the pistons in one cylinder to the opposite pistons in the other cylinder, means for transmitting motion from the two pairs of cross connected pistons separately to the respective crank shafts and gearing between the crank shafts in order to maintain them in proper phase relationship, the said cylinders being arranged with their axes in a plane at right angles to the crank shafts and both of the latter being located adjacent to one pair of contiguous cylinder ends.

2. An internal combustion engine of the kind referred to, comprising a pair of cylinders arranged side by side, a pair of coacting crank shafts also arranged side by side adjacent to one pair of contiguous cylinder ends but at right angles to the plane containing the axes of the cylinders, two oppositely disposed pistons in each cylinder adapted to move in opposite directions, means separately connecting each piston in one cylinder to the oppositely situated piston in the other cylinder, means separately connecting the pistons at a contiguous pair of cylinder ends to the adjacent crank shafts, and gearing between the crank shafts in order to maintain them in proper phase relationship.

3. An internal combustion engine of the kind referred to, comprising a pair of cylinders arranged side by side, a pair of co-acting crank shafts also arranged side by side adjacent to one pair of contiguous cylinder ends but at right angles to the plane containing the axes of the cylinders, two oppositely disposed pistons in each cylinder adapted to move in opposite directions, means separately connecting each piston in one cylinder to the oppositely situated piston in the other cylinder, means separately connecting the pistons at a contiguous pair of cylinder ends to the adjacent crank shafts, and gearing between the crank shafts in order to maintain them in proper phase relationship said gearing comprising teeth formed on the crank webs of the crank shafts.

4. An internal combustion engine of the kind referred to comprising a pair of cylinders arranged side by side, a pair of co-acting crank shafts also arranged side by side adjacent to one pair of contiguous cylinder ends but at right angles to the plane containing the axes of the cylinders, two oppositely disposed pistons in each cylinder adapted to move in opposite directions, means separately connecting each piston in one cylinder to the oppositely situated piston in the other cylinder, means separately connecting the pistons at a contiguous pair of cylinder ends to the adjacent crank shafts, a supplementary power shaft, and gearing constituting a permanent drive between said power shaft and both crank shafts.

5. An internal combustion engine of the kind referred to, comprising a pair of cylinders arranged side by side, a pair of oppositely revoluble crank shafts also arranged side by side adjacent to one pair of contiguous cylinder ends but at right angles to the plane containing the axes of the cylinders, two oppositely disposed pistons in each cylinder adapted to move in opposite directions, means separately connecting each piston in one cylinder to the oppositely situated piston in the other cylinder, means separately connecting the pistons at a contiguous pair of cylinder ends to the adjacent crank shafts, a supplementary power shaft, gearing between one end of such shaft and one of the crank shafts, and reverse gearing between the other end of the power shaft and the remaining crank shaft.

6. In an internal combustion engine of the kind referred to, the combination with a plurality of oppositely revoluble crank shafts, of a power shaft common to all such crank shafts, and made in sections, gearing permanently connecting each crank shaft separately with the power shaft and means whereby a section of the power shaft with an associated number of crank shafts, can be coupled to and uncoupled from another section of the power shaft with its associated crank shafts.

7. In an internal combustion engine of the kind referred to, the combination with a plurality of pairs of oppositely revoluble crank shafts, of a plurality of units each comprising a pair of cylinders arranged side by side with their axes in a plane at right angles to the shafts, two oppositely movable pistons in each cylinder, coupling rods connecting the pistons in one cylinder to the opposite pistons in the other cylinder and means for transmitting motion from the two pairs of cross connected pistons separately to the respective crank shafts, the axis of one unit being inclined with respect to that of an adjacent unit so that the units are disposed radially in the plane aforesaid and part of the power of two adjacent units is transmitted by the means aforesaid to one and the same crank shaft.

8. An internal combustion engine of the kind referred to, comprising two revoluble shafts arranged side by side, cranks therein, a pair of cylinders arranged with their axes in a plane at right angles to the said shafts and with such axes inclined to one another so that they converge in a direction away from the shafts, two oppositely movable pistons in each cylinder, coupling rods connecting the pistons in one cylinder to the opposite pistons in the other cylinder, and means for transmitting motion from the two pairs of cross connected pistons separately to the respective crank shafts.

9. In an internal combustion engine, the combination with a cylinder having two oppositely movable pistons therein, of two crank shafts both located adjacent to one end of the cylinder and means separately connecting the pistons aforesaid to the crank shafts so that approximately half the power generated in the cylinder is transmitted to each of such crank shafts.

Signed at Newcastle-on-Tyne, England, this twenty sixth day of September 1918.

ROBERT PRICE KERR.

Copies of this patent may be obtained for five cents each, by addressing the "Commissioner of Patents, Washington, D. C."